United States Patent [19]
Tang et al.

[11] Patent Number: 5,982,638
[45] Date of Patent: Nov. 9, 1999

[54] SINGLE STAGE POWER CONVERTER WITH REGENERATIVE SNUBBER AND POWER FACTOR CORRECTION

[75] Inventors: Allen Tang, Hong Kong; Eric Ho, Kowloon, both of The Hong Kong Special Administrative Region of the People's Republic of China

[73] Assignee: Astec International Limited, Hong Kong, The Hong Kong Special Administrative Region of the People's Republic of China

[21] Appl. No.: 08/963,597

[22] Filed: Oct. 31, 1997

[51] Int. Cl.[6] .......................... H02M 3/335; H02M 3/24
[52] U.S. Cl. ................... 363/21; 363/16; 363/97; 363/20
[58] Field of Search ..................... 363/21, 56, 55, 363/89, 16, 37, 20

[56] References Cited

U.S. PATENT DOCUMENTS

| | | | |
|---|---|---|---|
| 4,184,197 | 1/1980 | Cuk et al. | 363/16 |
| 4,274,133 | 6/1981 | Cuk et al. | 363/39 |
| 4,977,493 | 12/1990 | Smith | 363/126 |
| 5,001,620 | 3/1991 | Smith | 363/89 |
| 5,173,846 | 12/1992 | Smith | 363/20 |
| 5,331,533 | 7/1994 | Smith | 363/20 |
| 5,349,284 | 9/1994 | Whittle | 323/207 |
| 5,410,467 | 4/1995 | Smith et al. | 363/131 |
| 5,430,633 | 7/1995 | Smith | 363/20 |
| 5,600,546 | 2/1997 | Ho et al. | 363/21 |
| 5,619,404 | 4/1997 | Zak | 363/21 |

OTHER PUBLICATIONS

"Oscillators—Snubber Circuits", cite unknown, (p. 56).

*Primary Examiner*—Peter S. Wong
*Assistant Examiner*—Rajnikant B. Patel
*Attorney, Agent, or Firm*—Coudert Brothers

[57] ABSTRACT

A single stage DC-DC power converter uses a combined power factor control and snubber circuit. The combined circuit uses a small inductor connected at one end to the positive rail of the DC power source, and at the other to the anode of a fast power diode. The cathode of the diode is connected to a node and to the anode of a second fast power diode. The cathode of the second diode is connected to a first terminal of the primary winding of the isolation transformer. The second terminal of the primary winding is connected to one side of a high-frequency switch. The other side of the switch is coupled to the negative rail of the DC power source (ground). A small snubber capacitor is connected between the node and the second terminal of the primary winding. A large storage capacitor is connected between the second terminal of the primary winding and ground.

9 Claims, 4 Drawing Sheets

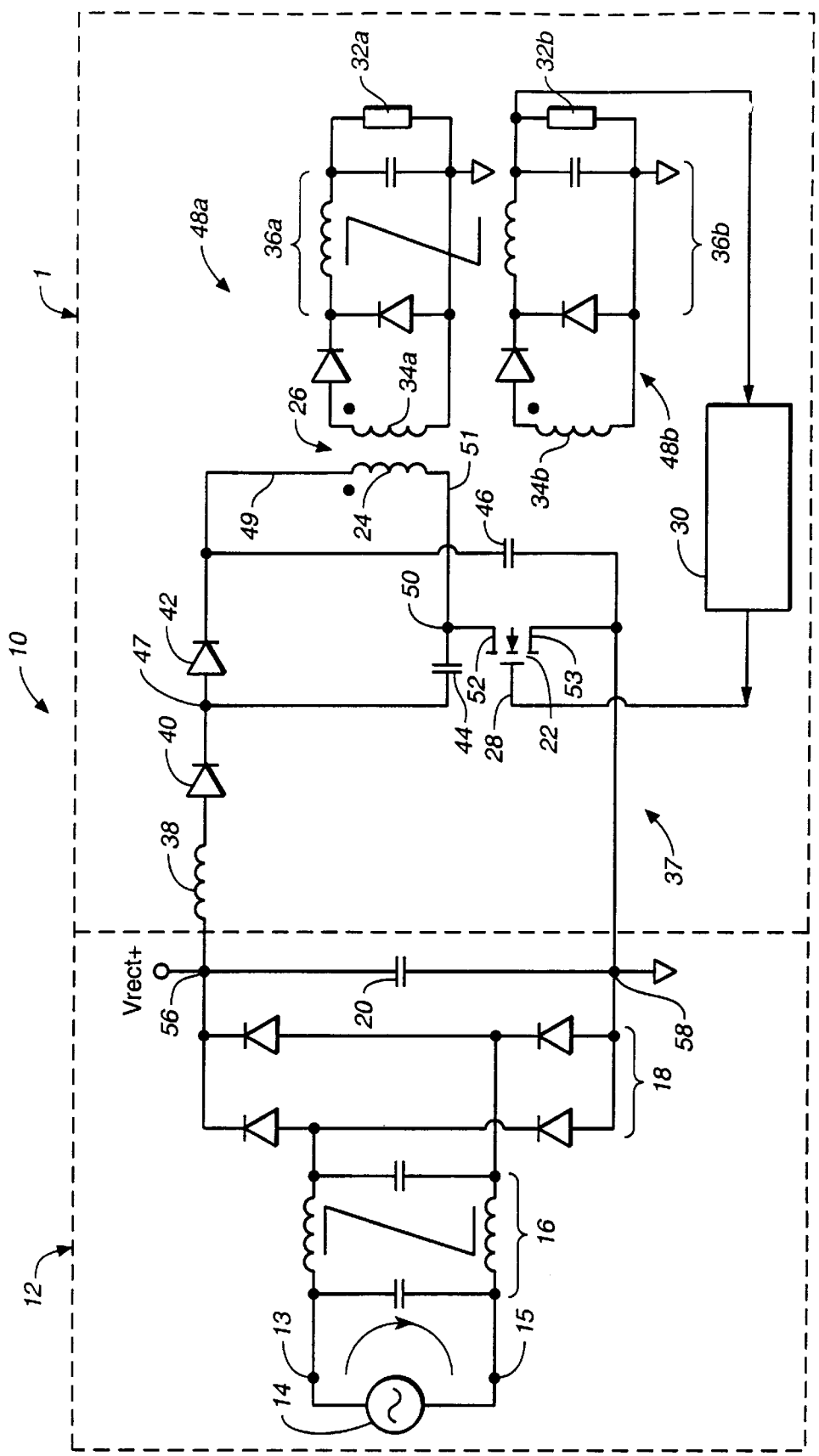
FIG._1

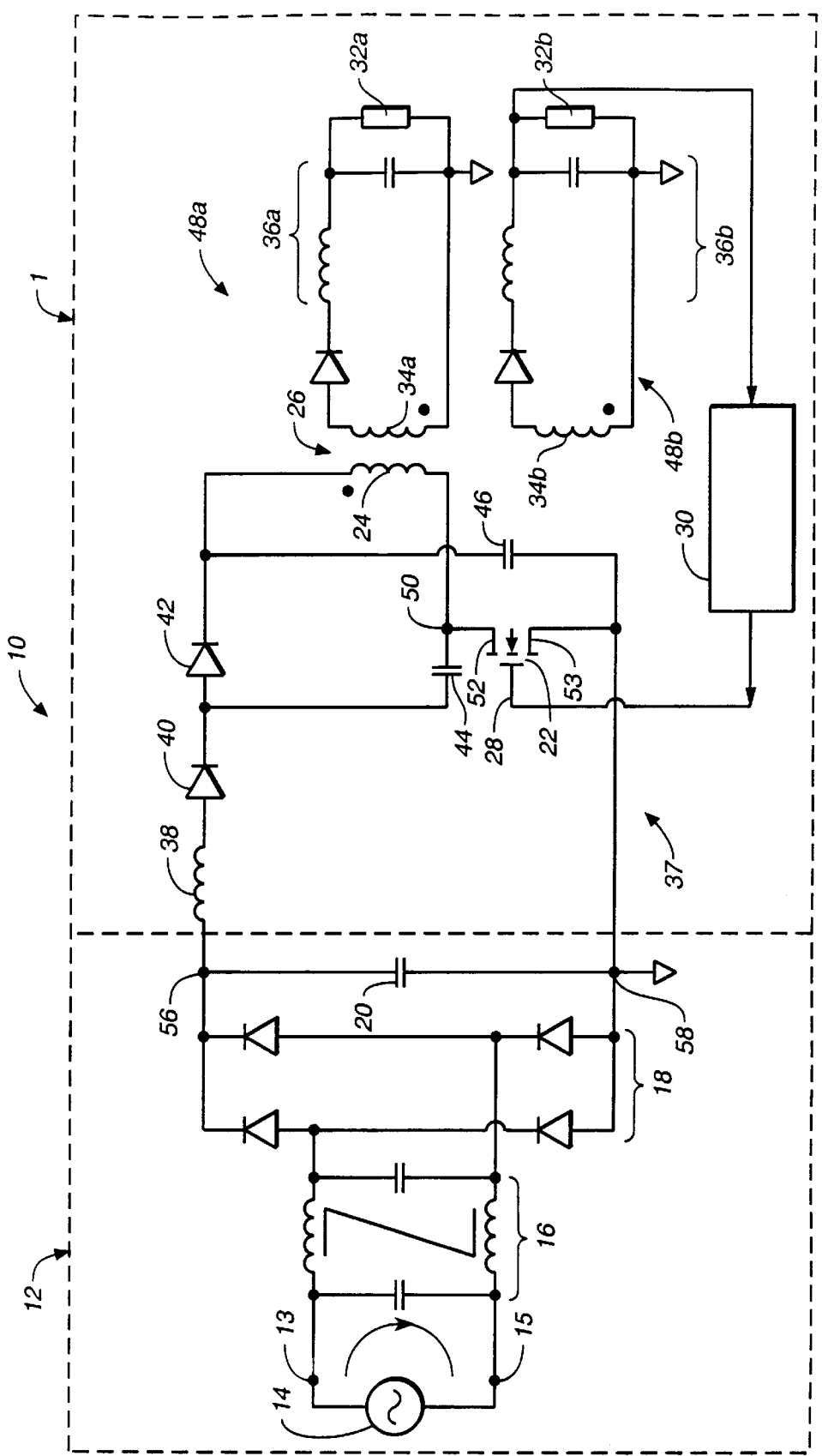
FIG._2

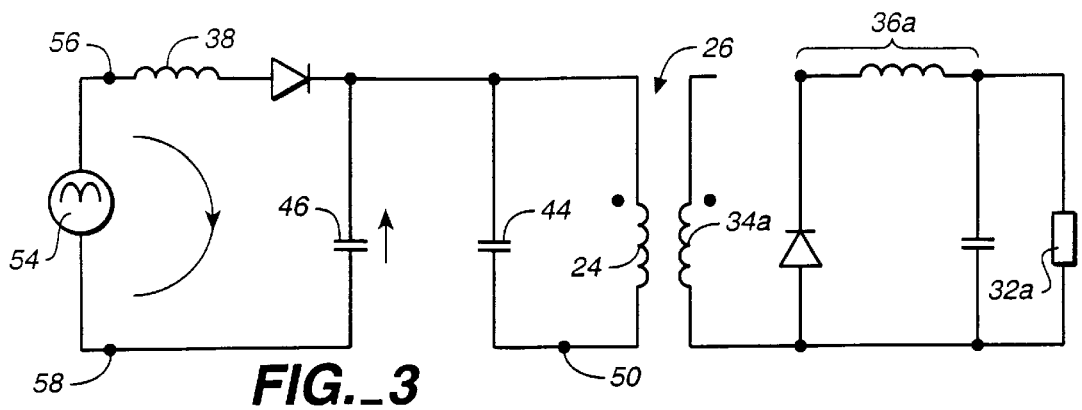
FIG._3
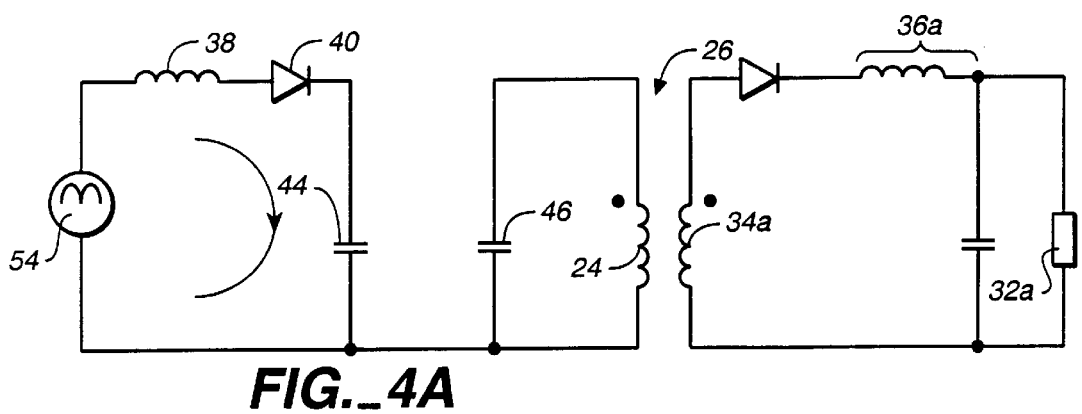
FIG._4A
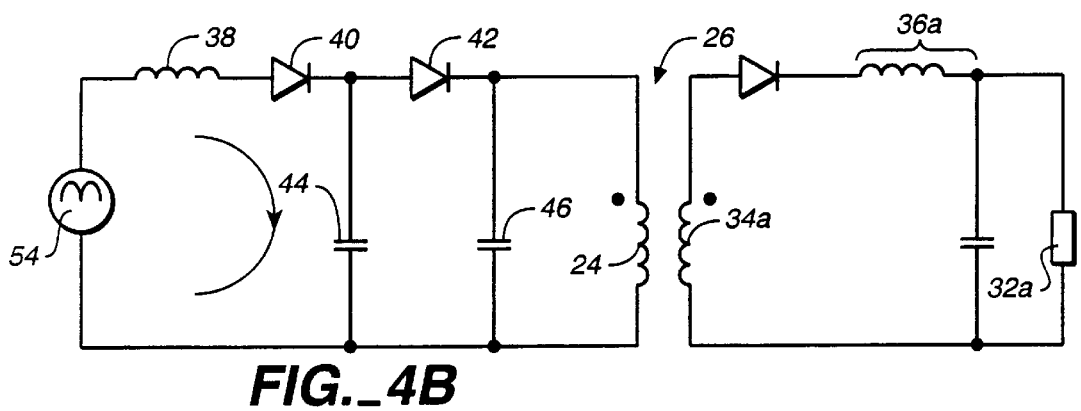
FIG._4B
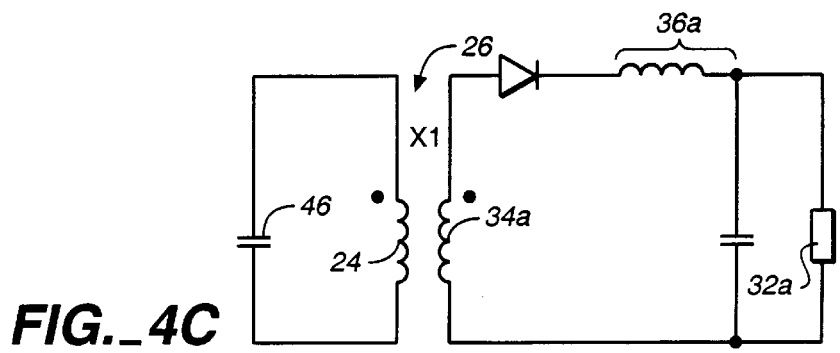
FIG._4C

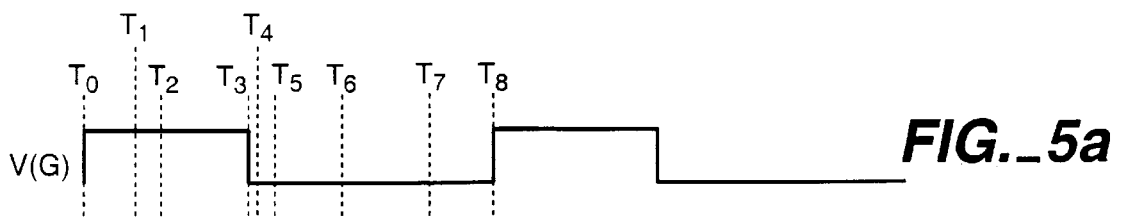
*FIG._5a*
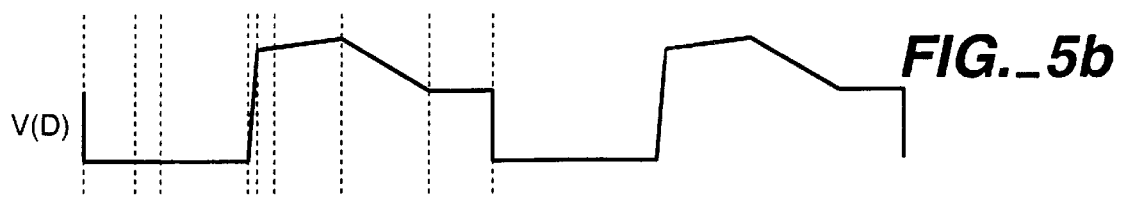
*FIG._5b*
*FIG._5c*
*FIG._5d*
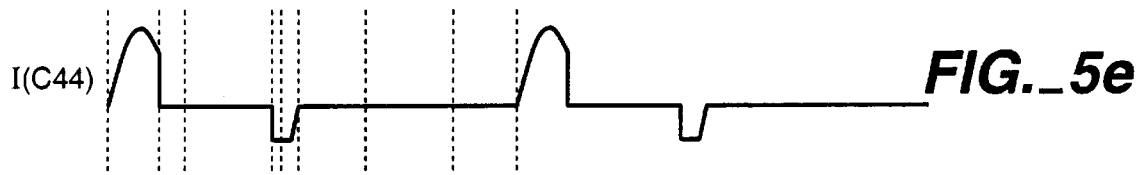
*FIG._5e*
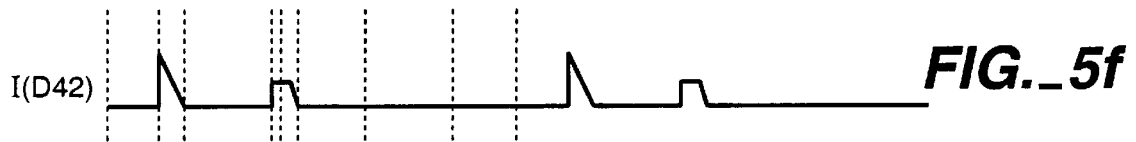
*FIG._5f*
*FIG._5g*
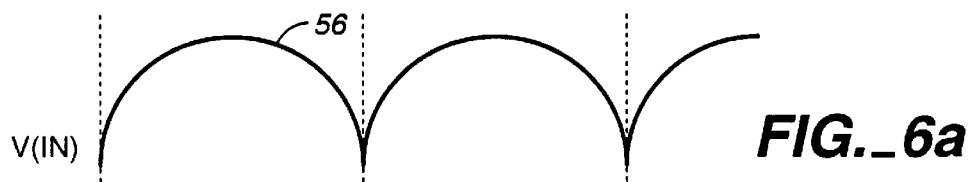
*FIG._6a*
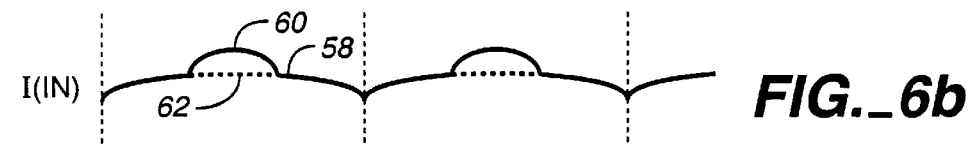
*FIG._6b*

SINGLE STAGE POWER CONVERTER WITH REGENERATIVE SNUBBER AND POWER FACTOR CORRECTION

Single stage PFC converter circuits are well known in the literature. Examples of such circuits are found, for example, in U.S. Pat. No. 4,184,197 (Cuk et al.), U.S. Pat. No. 4,274,133 (Cuk et al.) and U.S. Pat. No. 5,619,404 (Zak).

U.S. Pat. No. 4,184,197 to Cuk et al. discloses a number of DC to DC switching converters whose input and output currents are "non-pulsating", i.e., wherein these currents do not periodically fall to zero. Only a certain amount of ripple remains in these currents. Currents are also disclosed for reducing one or the other of these ripple currents to zero. To achieve non-pulsating input and output currents with isolation in a single stage, Cuk et at al. proposes to use two pair of capacitors and indicators and an isolation transformer positioned between each pair, as shown in FIG. 10 of U.S. Pat. No. 4,184,197. The drawback of this topology is that the output capacitors must be duplicated on the output side of every secondary winding in a multichannel converter, making the converter unacceptably bulky.

U.S. Pat. No. 4,274,133 is a follow-up patent to U.S. Pat. No. 4,184,197, in which reduction of the ripple current is achieved by coupling the input and output inductors in a single magnetic circuit. Thus the component count is reduced by one, but again, separate coupling capacitors are still required for each output channel.

U.S. Pat. No. 5,619,404 to Zak shows a multi-channel single-stage AC to DC converter having a high power factor. A pair of anti-phase capacitors are connected on the input side (primary side of the switching transformer) of the DC to DC converter so that when the power switch is off, a first one of the capacitors receives energy from the AC supply while a second one of the capacitors receives energy from the transformer. When the power switch is on, the first capacitor restores energy to the transformer and the second capacitor restores energy to the AC supply. Like the converters shown in U.S. Pat. No. 4,184,197 and U.S. Pat. No. 4,274,133, the resultant input current is non-pulsating. Unlike those two earlier patents, however, only a single pair of capacitors is required irrespective of the number of outputs, but the output current is no longer non-pulsating. A buck converter variation of Zak's current is shown in FIG. 2 of that patent and a boost or flyback converter variation is disclosed in FIG. 3 of that patent.

Zak's buck converter is only suitable for constant load, and hold-up time is difficult to achieve in practice. The flyback converter disclosed by Zak has a capacitor voltage equal to the reflected secondary voltage plus the AC peak voltage, which imposes her voltage on the storage capacitor than conventional flyback converters.

It is also conventional to equip power converters with resonant snubber circuits that reduce the peak power seen by the switching transistor, and thereby reduce switching losses. Typical snubber circuits may use a resistor-capacitor network connected across the transformer primary, or a diode-resistor network connected across the source and drain of the switching transistor.

In the prior art, snubber circuits have thus far been considered separate in structure and function from the combined PFC and power conversion circuitry, and have therefore required separate components in addition to the PFC and power conversion circuitry.

SUMMARY OF THE INVENTION

The present invention provides an efficient multi-channel single-stage AC to DC converter with a high power factor and a minimum of components. In accordance with the invention, the resonant snubber circuit used in conventional converters and the boost converter circuits employed in most power factor correction circuits are integrated into a single network to achieve a high power factor converter. The invention uses no extra snubber network and minimizes the voltage on the converter's storage capacitor.

Broadly stated, the invention achieves the above objectives by providing a power converter including a small inductor in series with a first fast power diode connected between the positive terminal of a DC power source and a node; a second fast power diode connected between the node and a first terminal of the primary winding of an isolation transformer; a switch connected between the second terminal of the primary winding and the negative (ground) terminal of the DC power source; a storage capacitor connected between the first terminal of the primary winding and the ground side of the DC supply; and a small snubber capacitor connected between the second terminal of the primary winding and the node.

In operation, the storage capacitor serves as the energy transfer capacitance for the transformer, while the snubber capacitor serves to reduce voltage spikes across the switch at turn-off by storing the primary winding's magnetic and leakage energy during the off period of the switch and returning it during the on period.

The circuit of the present invention, although it resembles the one in U.S. Pat. No. 5,619,404, works totally differently. In contrast to the holding capacitor of U.S. Pat. No. 5,619,404, the snubber capacitor of the present invention is a very small capacitor. Also, the small boost inductor of the present invention, unlike the boost inductor of U.S. Pat. No. 5,619,404, works in a discontinuous mode.

When the switch is off, the snubber capacitor of the present invention receives energy from the transformer. The storage capacitor only receives energy from the AC supply when its voltage is below the AC voltage. When the switch is on, the storage capacitor transfers energy to the transformer, while a number of events happen to the PFC network. First, the snubber capacitor will be charged in a resonant fashion, thus drawing current from the AC line. In a later stage, line current is diverted to charge the storage capacitor as the voltage on the snubber capacitor exceeds that of the storage capacitor, boosting the voltage on the storage capacitor. This is totally different from the operation of the circuit of U.S. Pat. No. 5,619,404.

BRIEF DESCRIPTION OF THE DRAWINGS

FIG. 1 is a circuit diagram of a forward type power converter using the combined snubber and PFC circuitry of the present invention;

FIG. 2 is a circuit diagram of a power converter similar to the converter of FIG. 1 but configured as a flyback converter;

FIG. 3 is an equivalent circuit diagram showing the operation of the circuit of FIGS. 1 and 2 when the switching transistor is off;

FIGS. 4a–c are equivalent diagrams illustrating the successive phases of the operation of the inventive circuit when the switching transistor is on;

FIGS. 5a–g are stylized (i.e., not to scale) time-amplitude diagrams, showing voltages and currents at various points in the circuit of FIGS. 1 and 2 during the operation of the circuit; and FIGS. 6a–b are time-amplitude diagrams showing the correlation between the input voltage and the input current.

DETAILED DESCRIPTION OF THE INVENTION

FIG. 1 illustrates a single stage high power factor forward converter 10 according to the invention. The converter 10 consists of a conventional input network 12 and a DC-to-DC converter (DCC) 13. The input network 12 consists of input terminals 13 and 15 to which an AC power source 14 is coupled, an EMI filter 16, and a bridge rectifier 18 with a smoothing capacitor 20. The DCC 13 receives a DC power input from the input network 12. A switching transistor or switch 22 is connected in series with the primary winding 24 of a transformer 26. The gate 28 of switch 22 is conventionally controlled by a pulse width modulator 30 which turns the switch 26 on and off at a high frequency. The duty cycle of the switch 22 is controlled by the pulse width modulator 30 in accordance with the voltage across load 32b. Switch 22 is preferably a field effect transistor (FET), but it is within the ordinary skill in the art to use a bipolar transistor or an insulated gate bipolar transistor (UGBT) in place of FET 22. Preferably, the drain 52 of FET switch 22 is connected to the primary winding and the source 53 of FET switch 22 is connected to the ground rail 58 of the DC supply.

The on-and-off switching of switch 22 produces a variable high-frequency AC current in primary winding 24 which induces a similar current in each of a plurality of secondary windings 34a, 34b, two of which are shown in FIG. 1. The secondary windings 34a, 34b drive conventional rectifying diodes and filtering networks 36a, 36b whose outputs are DC voltages appropriate for the loads 32a, 32b, respectively.

The combined snubber-PFC circuit 37 of the present invention consists of a small inductor 38, two fast power diodes 40 and 42, a small snubber capacitor 44 and the large conventional storage or energy transfer capacitor 46. The inductor 38 is connected on one end to the positive DC supply rail or terminal 56, and on its other end to the anode of the diode 40. The cathode of diode 40 is connected to a node 47. The diode 42 has its anode connected to node 47, and its cathode to the first (dotted) terminal 49 of primary winding 24. The snubber capacitor 44 is connected between the node 47 and the junction 50 between the second terminal 51 of the primary winding 24 and the switch 22. The storage capacitor 46 is connected across the primary winding 24 and switch 22 between the dotted terminal 49 and the ground rail or terminal 58 of the DC supply. The functioning of the circuit 37 is detailed below in conjunction with FIGS. 3 through 5g.

FIG. 2 shows an alternative embodiment of the invention in which the DCC is configured as a single stage flyback converter. Although the operation of the secondary circuits 48a and 48b, in transferring power from the secondary windings 34a, 34b to the loads 32a, 32b, is somewhat different, the operation of the combined snubber-PFC circuit 37 in the embodiment of FIG. 2 is essentially the same as in FIG. 1.

FIG. 3 depicts the equivalent circuit of the converter 10 of FIG. 1 when the switch 22 is off. As the current through primary winding 24 and switch 22 (FIG. 1) drops abruptly when the switch 22 turns off, the induced voltage in the primary winding 24 forces the voltage at the junction 50 to increase rapidly, forward-biasing diode 42 (FIG. 1) and effectively connecting snubbing capacitor 44 across the primary winding 24. The snubbing capacitor 44 stores the leakage and magnetizing inductance energy of transformer 26. In doing so, it also limits the maximum voltage at junction 50 and consequently on the drain 52 of switch 22.

The capacitor 44 thus performs the snubbing function by limiting the rate of drain voltage change and reducing the turn-off switching loss of switch 22.

On the input side of the equivalent circuit of FIG. 3, a circuit is formed by the DC power source 54 appearing across junctions 56, 58, the inductor 38, and the large storage capacitor 46 typically associated with a boost converter. In the discontinuous mode (DCM) operation of circuit 37, the current through inductor 38 is zero before switch 22 goes off, because the storage capacitor 46 is charged to the peak voltage of source 54 and back-biases the diode 40 (Diode 40 can only conduct when the voltage of source 54 is greater than the voltage on the large storage capacitor 46). If the voltage on storage capacitor 46 starts to drop below the peak voltage of the source 54, the action of diode 40 will charge it back up.

FIGS. 4a through 4c illustrate what happens when switch 22 turns on. In that condition, the storage capacitor 46 is connected across primary winding 24 and transfers energy to it. When the switch 22 turns on, three distinct topological stages occur in succession in the circuit 37. In the first stage, the resonant charging stage of the snubber capacitor 44 (FIG. 4a), the snubber capacitor 44 is initially charged negatively by the leakage and magnetizing energy of transformer 26 so as to turn diode 42 off and diode 40 on. This circuit configuration causes inductor 38 and snubber capacitor 44 to form a series resonant circuit that draws a half-sinusoidal current through the boost inductor 38. Resonance is formed first from the leakage inductance and then from the magnetizing inductance of the transformer 26, together with the parasitic capacitance of switch 22. Because the resonance period is made much shorter than the on time of switch 22, the snubber capacitor 44 rapidly charges in the positive direction until its voltage is substantially equal to that of the storage capacitor 46. At this point, diode 42 is no longer back-biased and turns on.

The circuit 37 then enters the second, boosting action, stage (FIG. 4b). In this stage, circuit 37 carries out the boost function of the converter 10. As diodes 40 and 42 both conduct, the voltage across inductor 38 reverses, and inductor 38 transfers its stored energy to snubber capacitor 44 and storage capacitor 46 until all of the energy stored in inductor 38 has been released, at which point diode 40 ceases to conduct.

At this point, the circuit 37 enters the third residual stage (FIG. 4c), in which the storage capacitor 46 begins to discharge through primary winding 24, but does not have time to lose any significant charge before the switch 22 turns off again.

FIGS. 5a through 5g show the action of the circuit as a function of time over two cycles of the pulse width modulator 30. At time $T_0$, the switch 22 turns on (FIG. 5a) as a function of the voltage V(G) output by pulse modulator 30 applied to the gate of transistor 22. The drain voltage V(D) of switch 22 (FIG. 5b) drops to essentially zero, as the source of the switch 22 is grounded. The current I(P) through the primary winding 24 (FIG. 5c) jumps sharply and then rises essentially linearly as energy is transferred from storage capacitor 46 to winding 24. Diode 40 begins to conduct and allows a half-sinusoidal current pulse I(D40) (FIG. 5d) to start flowing from inductor 38 to snubber capacitor 44. The current I(C44) through the snubber capacitor 44 (FIG. 5e) rises accordingly. Diode 42 remains off (FIG. 5f), and the current I(C46) through storage capacitor 46 (FIG. 5g) rises in the same manner as the current in primary winding 24.

At time $T_1$, diode 42 starts conducting current I(D42) and diverts the current from the inductor 38 away from snubber capacitor 44. The latter's current drops abruptly to zero. The current pulse through diode 42 momentarily reverses the discharging current in storage capacitor 46.

At time $T_2$, the half-sinusoidal pulse from inductor 38 is exhausted, and all current except the discharge current flowing from the storage capacitor 46 drops to zero.

At time $T_3$, switch 22 turns off. The drain voltage of switch 22 rises rapidly to a level higher than that of storage capacitor 46 because of the induced current in winding 24. The snubber capacitor 44, however, rapidly (at time $T_4$) begins to drain the induced current and essentially clamps the drain voltage. The turn-off of switch 22 also rapidly decreases the current through storage capacitor 46 and primary winding 24 to near zero. Simultaneously, the leakage and magnetizing energy of transformer 26 drive snubber capacitor 44 in the opposite direction, thereby creating a negative current pulse through snubber capacitor 44 and a corresponding positive pulse through the diode 42, ending at time $T_5$.

At time $T_6$, the rise of the drain voltage of switch 22 caused by the induced current in winding 24 has slowed enough for the snubber capacitor 44 to bring the drain of switch 22 back down at $T_7$ to the steady-state voltage of storage capacitor 46. Finally, at time $T_8$, the switch 22 turns on again, and the cycle repeats.

FIGS. 6a and 6b illustrate the phase relationship between the rectified AC input voltage 56 of source 54 and the current 58 drawn from the source 54 as a result of the operation of the snubber-PFC circuit 37. It will be noted that the input voltage and current are basically in phase, denoting a high power factor. A discontinuity 60 skews the phase relationship slightly at higher loads but essentially disappears (dotted line 62) as the load decreases.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A power converter, comprising:
   a. a source of DC power having positive and negative terminals;
   b. a transformer having a primary winding with first and second terminals, and at least one secondary winding connected to supply DC power to a load;
   c. a switch having first and second terminals connected in series with said primary winding, the first terminal of said switch being connected to the second terminal of said transformer, the second terminal of said switch connected to the negative terminal of said DC power source;
   d. a pulse width modulator connected to said load, said pulse width modulator being arranged to turn said switch on and off at high frequency with a duty cycle which is a function of the voltage across said load; and
   e. a combined snubber and power factor correction circuit interconnecting said DC power source and said primary winding, said circuit including:
      i. a storage capacitor connected across said series connection of said primary winding and said switch the first terminal of said transformer and the negative terminal of said DC power source;
      ii. an inductor and a first diode connected in series between the positive terminal of said DC power source and a node;
      iii. a second diode connected between said node and said first terminal of said primary winding; and
      iv. a snubber capacitor connected between said node and said second terminal of said primary winding;
   wherein said inductor and snubber capacitor form a resonant circuit whose time constant is less than the on time of said switching transistor and wherein said snubber capacitor of said combined snubber and power factor correction circuit limits the transient voltage across said switch when said switch is turned off by said pulse width modulator.

2. The converter of claim 1, in which said switch is a field effect transistor, IGBT or bipolar transistor.

3. The converter of claim 1, in which said switch is a bipolar transistor.

4. The converter of claim 1, in which said switch is an IGBT transistor.

5. The converter of claim 1, in which said converter is a forward converter.

6. The converter of claim 1, in which said converter is a flyback converter.

7. The converter of claim 1, in which the capacitance of said storage capacitor is much larger than the capacitance of said snubber capacitor.

8. The converter of claim 1, further comprising a pair of input terminals for connecting to an AC power source, a bridge rectifier and a smoothing capacitor, said smoothing capacitor connected across said positive and negative terminals, said bridge rectifier rectifing said AC power source such that said DC power source is generated across said positive and negative terminals.

9. A single stage AC to DC converter having a high power factor, comprising:
   a pair of input terminals for connecting to an AC power source;
   a bridge rectifier connected across said input terminals for converting the AC power source to a D.C. power source;
   a DC to DC converter having positive and negative terminals connected to the output of said bridge rectifier for receiving said D.C. power source, and including a transformer having a primary winding with first and second terminals, and at least one secondary winding connected to supply DC power to a load; a switch having first and second terminals connected in series with said primary winding, the first terminal of said switch being connected to the second terminal of said transformer, the second terminal of said switch connected to the negative terminal of said DC power source; a pulse width modulator connected to said load, said pulse width modulator being arranged to turn said switch on and off at high frequency with a duty cycle which is a function of the voltage across said load; and a combined snubber and power factor connection circuit interconnecting said DC power source and said primary winding, said circuit including a storage capacitor connected across said series connection of said primary winding and said switch; an inductor and a first diode connected in series between the positive terminal of said DC power source and a node; a second diode connected between said node and said first terminal of said primary winding; and a snubber capacitor connected between said node and said second terminal of said primary winding, wherein said inductor and snubber capacitor form a resonant circuit whose time constant is less than the on time of said switching transistor and wherein said snubber capacitor of said combined snubber and power factor correction circuit limits the transient voltage across said switch when said switch is turned off by said pulse width modulator.

* * * * *

UNITED STATES PATENT AND TRADEMARK OFFICE
CERTIFICATE OF CORRECTION

PATENT NO. : 5,982,638
DATED : November 9, 1999
INVENTOR(S) : Allen Tang, Eric Ho It is certified that error appears in the above-indentified patent and that said Letters Patent is hereby corrected as shown below:

Column 6, lines 1-2: delete "said series connection of said primary winding and said switch"

Signed and Sealed this

Fourteenth Day of November, 2000

Attest:

Q. TODD DICKINSON

Attesting Officer     Director of Patents and Trademarks